No. 870,734. PATENTED NOV. 12, 1907.
C. H. MEYERS & H. LOUDENSLAGER.
BOILER TUBE SCARFING MACHINE.
APPLICATION FILED MAY 29, 1905.

WITNESSES:
INVENTORS

UNITED STATES PATENT OFFICE.

CHARLES HENRY MEYERS AND EDWARD LOUDENSLAGER, OF COLUMBUS, OHIO.

BOILER-TUBE-SCARFING MACHINE.

No. 870,734.  Specification of Letters Patent.  Patented Nov. 12, 1907.

Application filed May 29, 1905. Serial No. 262,839.

*To all whom it may concern:*

Be it known that we, CHARLES HENRY MEYERS and EDWARD LOUDENSLAGER, citizens of the United States, residing at Columbus, in the county of Franklin and State of Ohio, have invented certain new and useful Improvements in Boiler-Tube-Scarfing Machines, of which the following is a specification.

Figure 1:
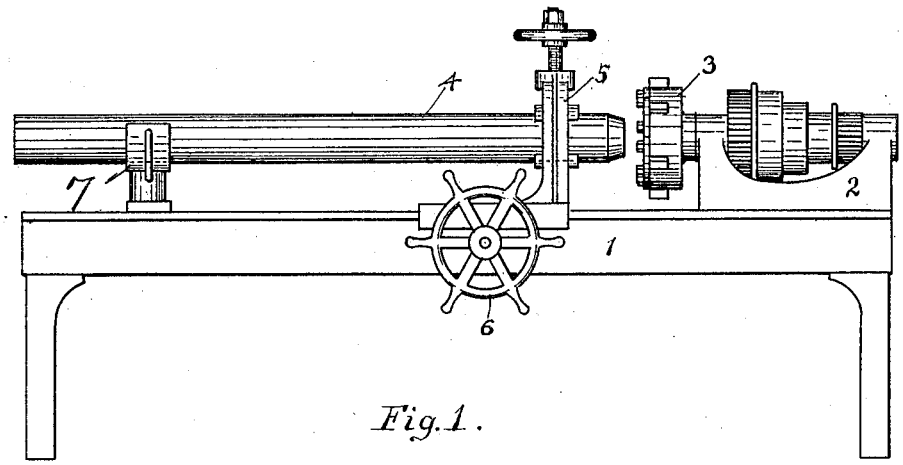
Figure 2:
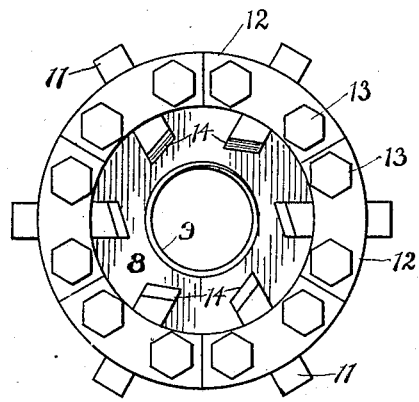
Figure 3:
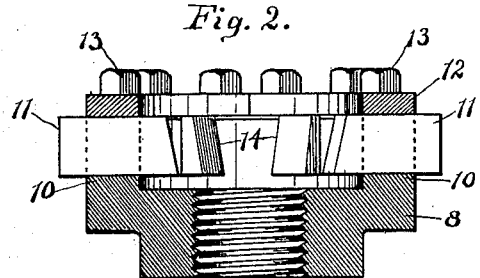

Our invention relates to improvements in a machine for scarfing the ends of boiler tubes preparatory to the welding of safe ends, consisting of a suitable lathe provided with revolving tools and means for bringing the work into contact with the tools, and is fully illustrated in the accompanying drawing, in which Figure 1 is a general view of the machine in operation. Fig. 2 a front view and Fig. 3 a sectional view of the female scarfing tool.

Similar numerals refer to similar parts throughout these views.

The frame 1 of a suitable lathe, carries a lathe head 2, the spindle of which carries the scarfing tool 3, causing it to revolve against the end of the tube 4 secured in the clamp 5, mounted slidably on the frame 1 in such a manner as to be moved toward or away from the lathe head by the feed wheel 6 at the will of the operator. The tail rest 7 is for the support of long tubes.

The female tool is designed to scarf the outside of the tube and consists of a circular steel body 8 provided with a threaded bore 9 for attachment to the spindle of the lathe head, and having on its front face a flange 10 cut by radial slots to carry the knives 11, which are clamped into place by the straps 12 and cap screws 13. The faces 14 of these knives are ground to the angle at which it is desired to cut the end of the tube.

What we claim as our invention and desire to secure by Letters Patent is—

In a device of the kind described, the combination with a body provided with radial spaced grooves and threaded recesses between the grooves, of a curved plate arranged over each groove provided with spaced apertures registering with the threaded recess of the body, and capscrews extending through said opening into said threaded recesses, for locking said plates to each side over said groove.

In testimony whereof we have signed our names to this specification in the presence of two subscribing witnesses.

CHARLES HENRY MEYERS.
EDWARD LOUDENSLAGER.

Witnesses:
ERNEST F. LOUDENSLAGER,
JACOB D. ESPER.